United States Patent [19]
Walter

[11] 3,754,117
[45] Aug. 21, 1973

[54] DEVICE FOR CORONA TREATMENT OF A LAYER OF PLASTIC MATERIAL

[75] Inventor: Jacques Walter, Geneve, Switzerland

[73] Assignee: Agence Nationale De Valorisation De La Recherche Anvar, Neuilly-sur-Seine, France

[22] Filed: Dec. 8, 1971

[21] Appl. No.: 205,903

[52] U.S. Cl.................. 219/383, 204/312, 250/49.5
[51] Int. Cl. ............................................. H05b 7/18
[58] Field of Search............................ 219/383, 384; 204/165, 168, 312; 250/49.5; 264/10, 22

[56] References Cited
UNITED STATES PATENTS

| | | | |
|---|---|---|---|
| 3,385,966 | 5/1968 | Rosenthal | 250/49.5 |
| 3,483,374 | 12/1969 | Erben | 250/49.5 |
| 2,922,883 | 1/1960 | Giaimo, Jr. | 250/49.5 |
| 3,351,740 | 11/1967 | Heuer | 219/384 |
| 3,405,052 | 8/1968 | Schirmer | 204/312 |
| 3,632,299 | 1/1972 | Thorsen | 204/312 X |

*Primary Examiner*—Volodymyr Y. Mayewsky
*Attorney*—William B. Kerkam, Jr. et al.

[57] ABSTRACT

A corona effect is produced across the layer of material to be treated by means of an intense electric field set up between two electrically insulated electrodes separated by a very narrow air-gap consisting of a slit which is formed at the extremity of an extruder head and through which the material is delivered continuously at its maximum temperature.

5 Claims, 1 Drawing Figure

Patented Aug. 21, 1973
3,754,117
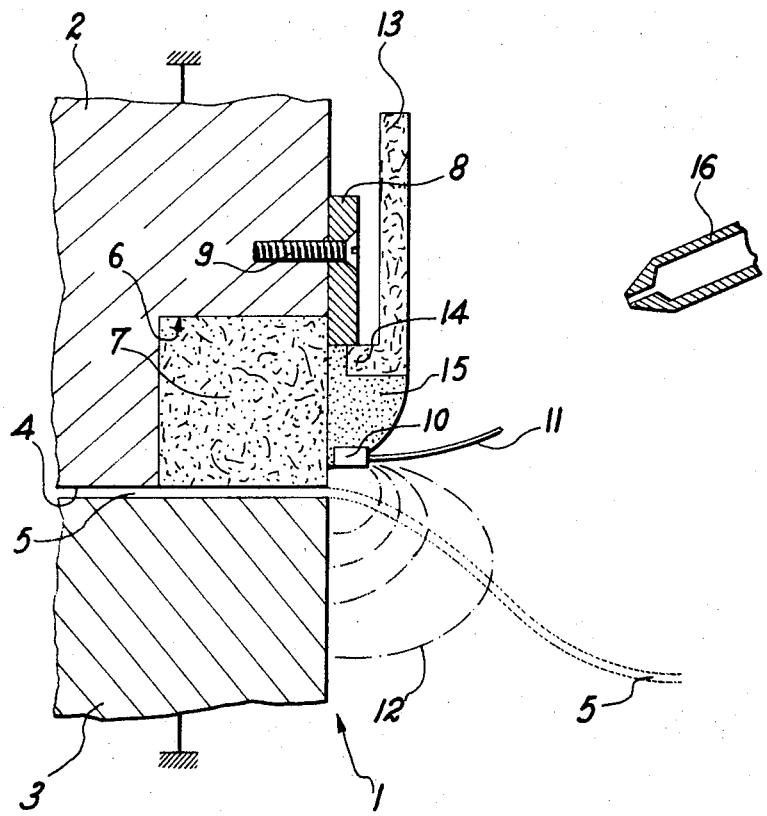

DEVICE FOR CORONA TREATMENT OF A LAYER OF PLASTIC MATERIAL

This invention relates to a device which makes it possible to treat continuously the surface of a thin layer or of a fiber of any material in order to improve, by suitably modifying its surface properties, the possibilities of adhesion of the material, of printing with an ink or a paint or of subsequent bonding, especially with a polyester or epoxy resin.

The invention applies more particularly although not exclusively to the treatment of sheaths or sheets of plastic material which are fabricated continuously by means of a machine of known type which is referred-to as an extruder and permits the production of such sheaths or sheets at a high and substantially constant rate of delivery at the outlet of the machine. In this case, the invention is even more especially concerned with the means which are directly adapted to the extruder head in order to carry out the treatment of these sheaths or sheets independently of the actual fabrication process.

To this end, the device considered is designed for the practical application of a method which is known per se, consisting in producing across the layer of plastic material to be treated a corona effect by means of an intense electric field which is produced between two insulated electrodes separated by a very narrow air-gap and acts on the layer in a zone in which this latter is brought to the maximum temperature which it is capable of withstanding.

To this end, said device being applicable especially to the treatment of a sheath or sheet of plastic material delivered continuously at its maximum temperature from a narrow slit formed in the head of an extruder and delimited by two parallel metallic components, is characterized in that it comprises a first electrode constituted directly by one of the two components and an element of electrically insulating material mounted in an open channel provided at the extremity of the second component which is located opposite to the first, said element being rigidly fixed on its front end face at the outlet of the extruder head to a small metallic plate which constitutes a second electrode.

Advantageously, the insulating element which is formed of ceramic material such as in particular either sintered alumina or alumina-titania is securely maintained in position within the channel of the second component by means of a metallic abutment member which is fixed on said component and applied against the front end face of the element without coming into contact with the small metallic plate.

In accordance with another characteristic feature, the small metallic plate is rigidly fixed to the insulating element by bonding with an adhesive having a silicone base.

In accordance with yet another characteristic feature, the device comprises an electrically insulating guard mask which is mounted in front of the metallic abutment member and surrounds this latter at least partially in order to prevent the formation of an electric arc between the small metallic plate which constitutes the second electrode and the second component.

Finally and in accordance with a further characteristic feature, the space which is formed by the insulating mask, the small metallic plate and the element which is carried by the second component is filled with an electrically insulating packing which is constituted in particular by a polymerizable silicone.

Further properties of the device considered will become apparent from the following description of one illustrative embodiment which is given by way of indication and not in any sense by way of limitation in order to illustrate the practical application of the method according to the invention.

The single FIGURE of the accompanying drawing is a diagrammatic longitudinal sectional view showing the head of an extruder of a type which is known per se and provided with means in accordance with the invention for producing in situ an intense electric field which produces a corona effect on a layer of plastic material as this latter is continuously delivered from said extruder at the extrusion temperature, that is to say at the maximum temperature which the plastic material considered is capable of withstanding.

In a manner which is basically conventional, an extruder head has two metallic components placed in oppositely facing relation and forming between them a narrow slit through which the plastic material escapes, said material being forced through the head by any suitable means after having been heated to a temperature which produces a suitable paste consistency. Depending on requirements, these two component parts of the extruder head can be either cylindrical and coaxial or flat and parallel. In the first case in which the plastic material is discharged from the head in the form of a cylindrical sheath, the two components are usually referred-to as a die in the case of the outer component and as a punch in the case of the inner component. In the second case, the extruder head is usually designated by the term ""flat head.""

The FIGURE of the accompanying drawing represents the cross-section of an extruder head which can be either of the first or of the second type. The section plane passes through the axis of the components if these latter are cylindrical and coaxial or is perpendicular to the intermediate slit if the components are flat. In the following description, it will be considered by way of assumption that the extruder head is of the first type.

In the FIGURE, the reference numeral 1 thus generally designates the extruder head formed of an outer die 2 and of an axial punch 3 between which is defined a narrow slit 4 for the passage and delivery of a sheath 5 of plastic material. The die 2 is provided towards the extremity of the slit 4 with a channel 6 which is open towards the exterior of the head 1. In said channel is placed an insulating element constituted by a rigid ring 7 which is capable of withstanding the temperature of the sheath 5. This ring 7 which is dimensionally stable is preferably formed of ceramic material and especially of sintered alumina or alumina-titania having the requisite properties and constituting an excellent electrical insulator. Said ring 7 is maintained within the channel 6 by means of a metallic abutment member 8 which is secured to the die 2 by means of screws 9, this abutment member being necessary in order to counteract the stresses applied to the ring 7 by the differential thermal expansions and the friction resulting from the flow of the sheath 5 of hot plastic material.

In accordance with the invention, the ring 7 supports, immediately at the outlet of the slit 4, an electrode 10 constituted by a small metallic plate or washer of stainless steel or of nickel on which is welded a conductive rod 11. The electrode is connected by means of said rod to a voltage source having characteristics which make it possible to produce a corona effect around the sheath 5, the necessary electric field being produced between the electrode 10 and the punch 3 which is connected to ground (earth) and performs the function of counter-electrode. Advantageously, the electrode 10 is secured against the front face of the insulating ring 7 by means of a heat-resistant adhesive and especially a polymerizable silicone adhesive. In the FIGURE, the reference numeral 12 designates the lines of force of the electric field produced between the electrodes 10 and 3 across the sheath 5 which is delivered from the head 1 at its maximum temperature.

In order to prevent the formation of an electric arc between the electrode 10 and the metallic die 2 which is also grounded (earthed) or the abutment member 8, the head 1 is provided with a guard mask 13 which is mounted in front of said abutment member, this mask being provided with a flange 14 which engages slightly beneath the abutment member. Finally, a packing 15 consisting of a heat-resistant and electrically insulating substance which is preferably plastic material is fixed by bonding beneath the mask 13 in order to fill the space which is left free between the ring 7, the abutment member 8 and the electrode 10. A polymerizable silicone can advantageously be employed to form this packing since its relative plasticity enables it to accommodate stresses arising from differential expansion processes.

Finally, the head 1 is associated with one or a number of nozzles such as the nozzle 16 which serve to blow onto the electrode 10 a gas or a mixture of gases which improve the surface treatment resulting from the corona effect such as, in particular, nitrogen charged with vapors of styrene, phenyl acetylene, water or any other suitable substance in suitably adapted proportions.

The foregoing arrangements thus make it possible to produce at the immediate outlet of the extruder head progressively as the plastic sheath is formed and in a zone in which the sheath is heated to the highest temperature which it is capable of withstanding, an intense electric field which can correspond to an interelectrode voltage of the order of 30,000 volts, thereby carrying out a surface treatment which is very substantially more effective than the treatment which would be obtained by means of a conventional corona effect produced on the plastic material when this latter is cooled to room temperature.

The sheath or sheet which is thus obtained and the material of which can be of any kind whatever, such as polyethylene, polyvinyl chloride, polypropylene, polystyrene and the like, accordingly has appreciably improved properties in regard to its bonding action with respect to other materials and especially thermosetting resin binders.

As has already been brought out by the foregoing, the invention is clearly not limited in any sense to the example which has been more especially described with reference to the drawings but extends to all alternative forms. In particular, the device is applicable with equal ease both to tubular sheaths and to any other form of material whose surface is to be treated, namely sheets, ribbons, threads and so forth. Moreover, it is worthy of note that the treatment achieved by means of the device according to the invention is not limited to the improvement of the bonding properties of the material but more generally develops its properties of adherence with respect to any substance which it is desired to apply thereto by adhesion, namely not only a substance such as a glue but also a substance such as a paint, an ink, a binder of composite material and the like. In the case last mentioned, the material is presented in the form of glass fibers, carbon, boron or the like. Finally, if the material to be treated is extruded in the form of a wire, the wire can serve directly as a counter-electrode.

What I claim is:

1. A device for treating a layer of plastic material by production of a corona effect by means of an intense electric field, said material being continuously extruded at its maximum temperature fron a narrow slit formed at the extremity of the head of an extruder, said slit being defined by two parallel opposed metallic components, comprising a first electrode of one of the two components, an element of electrically insulating material mounted in an open channel at the extremity of the second component, a second metallic plate electrode mounted on said element at the outlet of the extruder head, a voltage source connected to said plate electrode, said element being securely maintained in position within the channel of the second component by a metallic abutment member secured to said component and applied against said element out of contact with said small metallic plate and an electrically insulating guard mask mounted in front of and surrounding said metallic abutment member preventing an electric arc between said metallic plate and the second component and means for providing a gaseous atmosphere about said electrodes.

2. A device in accordance with claim 1, wherein the small metallic plate is rigidly fixed to the insulating element by bonding with an adhesive having a silicone base.

3. A device in accordance with claim 1, wherein the space which is formed by the mask, the small metallic plate and the insulating element which is carried by the second component is filled with an electrically insulating packing which is constituted in particular by a polymerizable silicone.

4. A device in accordance with claim 1, wherein the gaseous atmosphere is constituted by nitrogen charged with vapors of styrene, phenyl-acetylene, water or any other suitable substance.

5. A device in accordance with claim 1, said insulating element being selected from the group consisting of sintered alumina and aluminatitania.

* * * * *